(12) United States Patent
Ohtani et al.

(10) Patent No.: US 7,239,742 B2
(45) Date of Patent: Jul. 3, 2007

(54) DISPLAY DEVICE AND CONTROL SYSTEM THEREOF

(75) Inventors: Tomohiko Ohtani, Tachikawa (JP); Tomomi Kamio, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 718 days.

(21) Appl. No.: 10/415,283

(22) PCT Filed: Sep. 10, 2002

(86) PCT No.: PCT/JP02/09235

§ 371 (c)(1),
(2), (4) Date: Apr. 28, 2003

(87) PCT Pub. No.: WO03/027825

PCT Pub. Date: Apr. 3, 2003

(65) Prior Publication Data

US 2004/0027364 A1   Feb. 12, 2004

(30) Foreign Application Priority Data

Sep. 19, 2001   (JP) .............................. 2001-285171

(51) Int. Cl.
*G06K 9/00* (2006.01)
(52) U.S. Cl. .................................... 382/162
(58) Field of Classification Search ................ 382/162, 382/164, 167, 282; 345/87–89, 98–100, 345/102, 167, 204, 211, 214, 690, 698
See application file for complete search history.

(56) References Cited

U.S. PATENT DOCUMENTS 5,844,539 A * 12/1998 Kitagawa .................... 345/100
5,867,140 A * 2/1999 Rader .......................... 345/98
6,236,388 B1 * 5/2001 Iida et al. ................... 345/698
6,393,145 B2 * 5/2002 Betrisey et al. ............. 382/162

(Continued)

FOREIGN PATENT DOCUMENTS

| EP | 0 974 952 A1 | 1/2000 |
| EP | 1 146 502 A2 | 10/2001 |
| EP | 1 211 662 A1 | 6/2002 |
| WO | WO 00/35170 | 6/2000 |

OTHER PUBLICATIONS

"MOS Integrated Circuit uPD161620, 432 Output TFT-LCD Source Driver with Ram" Jul. 2001, NEC Corporation Preliminary Product Information, Japan, XP002250541 Document No. S14797EJ3V7PM00 (3rd Edition).

*Primary Examiner*—Jose L. Couso
(74) *Attorney, Agent, or Firm*—Frishauf, Holtz, Goodman & Chick, P.C.

(57) ABSTRACT

A display device includes a display panel having display pixels arranged in a matrix, and a display area capable of displaying in color. A display mode of the display panel is switched to either a full-screen display mode in which an image is displayed in the entire display area or a partial display mode in which an image is only partially displayed in the display area. The display area of the display panel is set while dividing the display area into a partial display area in which an image is displayed and a background display area in which an image is not displayed in the partial display mode. An image is displayed in the partial display area. A display color of the background display area is set.

22 Claims, 13 Drawing Sheets

U.S. PATENT DOCUMENTS

| | | | |
|---|---|---|---|
| 6,486,862 B1 * | 11/2002 | Jacobsen et al. | 345/88 |
| 6,804,029 B2 * | 10/2004 | Kondoh et al. | 358/3.01 |
| 6,831,662 B1 * | 12/2004 | Lum et al. | 345/698 |
| 7,034,816 B2 * | 4/2006 | Yatabe | 345/213 |
| 7,043,276 B2 * | 5/2006 | Kokubo | 455/566 |
| 7,068,253 B2 * | 6/2006 | Kudo et al. | 345/99 |

* cited by examiner

RGB COLORATION TABLE

| R | G | B | COLOR OF BACKGROUND DISPLAY SECTION |
|---|---|---|---|
| 0 | 0 | 0 | BLACK |
| 0 | 0 | 1 | BLUE |
| 0 | 1 | 0 | GREEN |
| 0 | 1 | 1 | CYAN |
| 1 | 0 | 0 | RED |
| 1 | 0 | 1 | MAGENTA |
| 1 | 1 | 0 | YELLOW |
| 1 | 1 | 1 | WHITE |

FIG.4

| REGISTER IDENTIFICATION CODE | | | | | REGISTER NAME | BIT | CONTENT |
|---|---|---|---|---|---|---|---|
| 1 | 1 | 0 | 0 | 1 | PSA | 0~7 | STARTING ADDRESS OF BACKGROUND DISPLAY AREA A |
| 1 | 1 | 0 | 1 | 0 | PEA | 0~7 | ENDING ADDRESS OF BACKGROUND DISPLAY AREA A |
| 1 | 1 | 0 | 1 | 1 | PSB | 0~7 | STARTING ADDRESS OF BACKGROUND DISPLAY AREA B |
| 1 | 1 | 1 | 0 | 0 | PEB | 0~7 | ENDING ADDRESS OF BACKGROUND DISPLAY AREA B |
| 1 | 1 | 1 | 0 | 1 | COLOR SETTING | 0 | RED (R) SETTING ON/OFF |
| | | | | | | 1 | GREEN (G) SETTING ON/OFF |
| | | | | | | 2 | BLUE (B) SETTING ON/OFF |
| | | | | | | ⋮ | ⋮ |
| ⋮ | ⋮ | ⋮ | ⋮ | ⋮ | ⋮ | ⋮ | ⋮ |

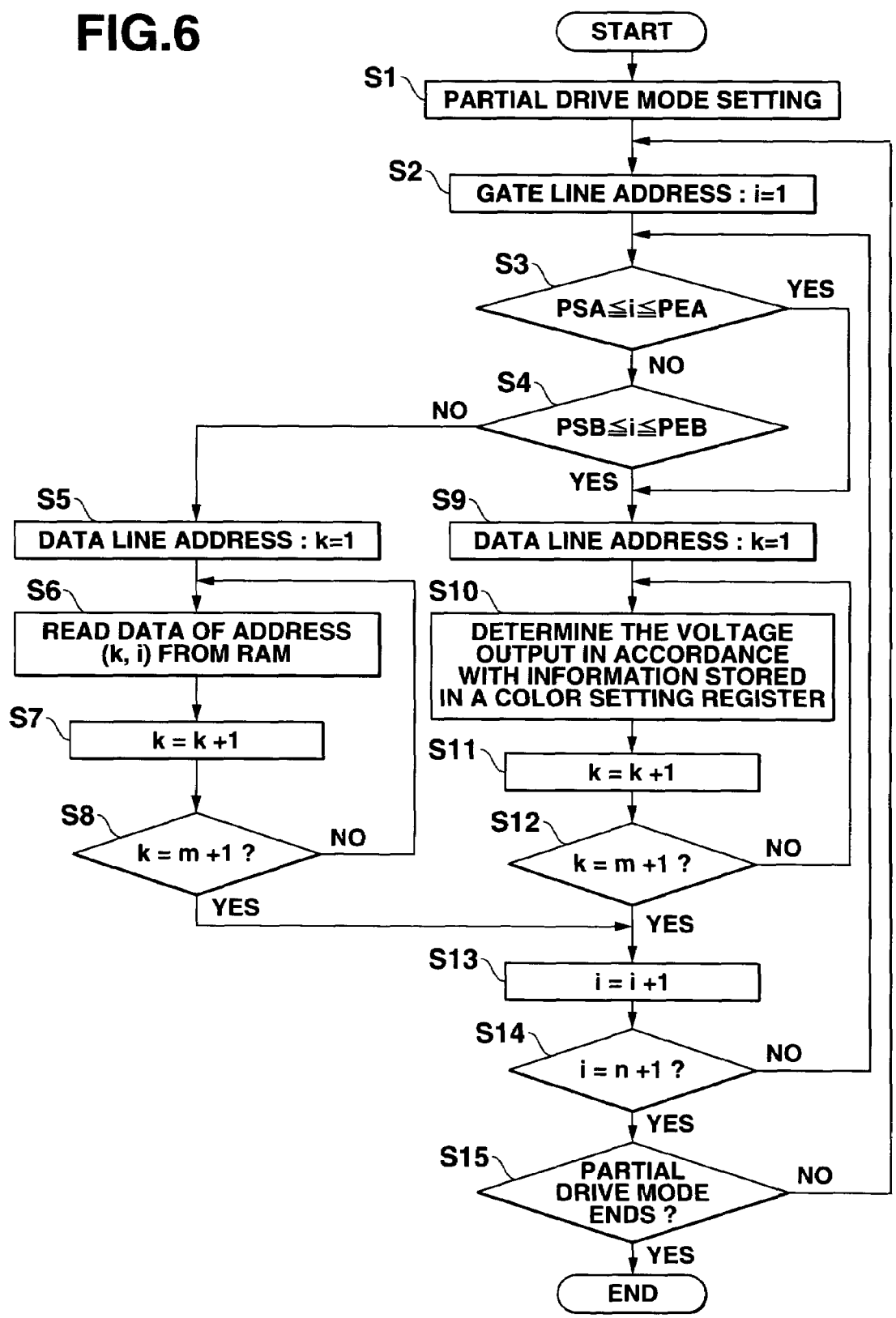

FIG.10
| BATTERY REMAINING AMOUNT | COLOR SPECIFICATION SIGNAL |
|---|---|
| 0~30% | 11101100 |
| 30~60% | 11101110 |
| 60~100% | 11101001 |
50
FIG.11A
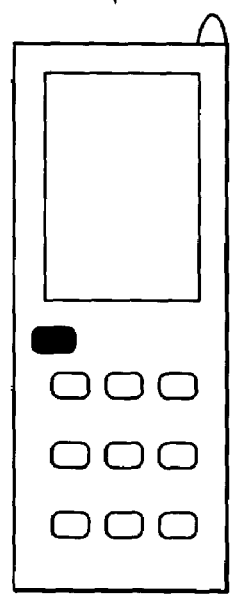
FIG.11B
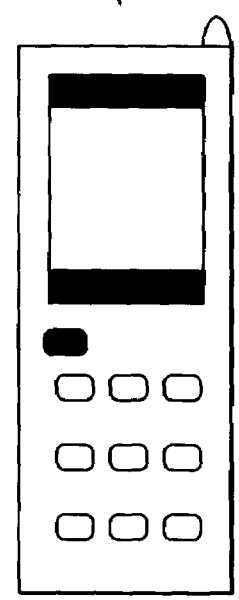

| CONDITION | COLOR SPECIFICATION SIGNAL |
|---|---|
| RECEIVING AN INCOMING CALL | 11101100 |
| OPERATION INPUT A | 11101110 |
| OPERATION INPUT B | 11101001 |
| ⋮ | ⋮ |

| INCOMING CALL SOUND | COLOR SPECIFICATION SIGNAL |
|---|---|
| INCOMING CALL SOUND A | 11101100 |
| INCOMING CALL SOUND B | 11101110 |
| INCOMING CALL SOUND C | 11101001 |
| ⋮ | ⋮ |

FIG.14

| SENDER | DATE AND HOUR OF INCOMING CALL |
|---|---|
| TELEPHONE NUMBER A | MONTH:A DAY:D HOUR:H MINUTE:L |
| TELEPHONE NUMBER B | MONTH:B DAY:E HOUR:I MINUTE:M |
| TELEPHONE NUMBER C | MONTH:C DAY:F HOUR:J MINUTE:N |
| ⋮ | ⋮ |

| NUMBER OF INCOMING CALLS | COLOR SPECIFICATION SIGNAL |
|---|---|
| 1~3 | 11101100 |
| 4~10 | 11101110 |
| 10~15 | 11101001 |
| ⋮ | ⋮ |

| SCHEDULE | DETAILED INFORMATION | DATE AND HOUR |
|---|---|---|
| EVENT A | DETAIL A | MONTH:A DAY:D HOUR:H MINUTE:L |
| EVENT B | DETAIL B | MONTH:B DAY:E HOUR:I MINUTE:M |
| EVENT C | DETAIL C | MONTH:C DAY:F HOUR:J MINUTE:N |
| ⋮ | ⋮ | ⋮ |

| RANGE OF TIME DIFFERENCE | COLOR SPECIFICATION SIGNAL |
|---|---|
| 50 TO 24 HOURS | 11101100 |
| 24 TO 15 HOURS | 11101110 |
| 15 TO 5 HOURS | 11101001 |
| ⋮ | ⋮ |

| REGISTER IDENTIFICATION CODE | | | | | REGISTER NAME | BIT | CONTENT |
|---|---|---|---|---|---|---|---|
| 1 | 1 | 0 | 0 | 1 | PSA | 0~7 | STARTING ADDRESS OF BACKGROUND DISPLAY AREA A |
| 1 | 1 | 0 | 1 | 0 | PEA | 0~7 | ENDING ADDRESS OF BACKGROUND DISPLAY AREA A |
| 1 | 1 | 0 | 1 | 1 | COLOR SETTING A | 0 | RED (R) SETTING ON/OFF |
| | | | | | | 1 | GREEN (G) SETTING ON/OFF |
| | | | | | | 2 | BLUE (B) SETTING ON/OFF |
| | | | | | | ⋮ | ⋮ |
| 1 | 1 | 1 | 0 | 0 | PSB | 0~7 | STARTING ADDRESS OF BACKGROUND DISPLAY AREA B |
| 1 | 1 | 1 | 0 | 1 | PEB | 0~7 | ENDING ADDRESS OF BACKGROUND DISPLAY AREA B |
| 1 | 1 | 1 | 1 | 0 | COLOR SETTING B | 0 | RED (R) SETTING ON/OFF |
| | | | | | | 1 | GREEN (G) SETTING ON/OFF |
| | | | | | | 2 | BLUE (B) SETTING ON/OFF |
| | | | | | | ⋮ | ⋮ |
| ⋮ | ⋮ | ⋮ | ⋮ | ⋮ | ⋮ | ⋮ | ⋮ |

# DISPLAY DEVICE AND CONTROL SYSTEM THEREOF

This application is a U.S. National Phase Application under 35 USC 371 of International Application PCT/JP02/09235 filed Sep. 10, 2002.

TECHNICAL FIELD

The present invention relates to a display device and a control system thereof, in particular, to a display device that performs a partial display and a portable apparatus comprising the device.

BACKGROUND ART

Recently, the functions of portable apparatus such as a mobile telephone, portable information terminal and the like, have been improved dramatically. As a display device in the apparatus of this kind, for example, a display device using a liquid crystal display panel is employed. Such display device has been required to display more information. For this reason, the resolution of a display screen has been increased year by year, and an image has been required to display in color and high image quality. Accordingly, the electric power consumption in the display device tends to increase.

In general, these portable apparatuses are driven by batteries, and it is required to lengthen their operating time. Therefore, it is seriously required to reduce the electric power consumption as much as possible, including the display device.

In view of the aforementioned circumstances, a structure, which employs, what is called, a partial display system so as to reduce the electric power consumption in the display device is now used in increasing numbers. In the partial display system, a full-screen display is performed if necessary, however an icon etc. are displayed in only a part of the display screen without performing the full-screen display and the other parts are turned into a non-display state in a stand-by mode, for example.

As a driving system for performing the partial display, various systems are employed. In any system, a non-display area is set to a state in which nothing is displayed by applying no voltage on display pixels therein, and thus the non-display area is set in black or white. For example, in the case where a display or non-display area is set in the unit of scanning lines, the scanning lines belonging to the non-display area are turned into a non-selected state, so that the display pixels are set to be applied with no voltage. In this case, in the case where the display device is configured such that a white display is performed in the state where no voltage is applied on the display pixels (Normally white mode), the non-display area is displayed in white. On the other hand, in the case where the display device is configured such that a black display is performed in the state where no voltage is applied on the display pixels (Normally black mode), the non-display area is displayed in black.

As described above, the conventional non-display area in a partial display operation has been displayed only in white or black, which has been boring and uninteresting.

DISCLOSURE OF INVENTION

The present invention has advantages, in a display device and a portable apparatus comprising the display device, such that a partial display is performed in a stand-by mode so as to reduce the electric power consumption, and the dullness at the time of displaying partially can be eliminated, and further the convenience of the apparatus can be improved.

To achieve the above described effect, a display device according to the invention comprises: a display panel including a plurality of display pixels arranged in a matrix, and a display area capable of displaying in color;

a display mode switching section which switches a display mode of the display panel to either a full-screen display mode in which an image is displayed in the entire display area of the display panel or a partial display mode in which an image is partially displayed in the display area of the display panel in accordance with a mode switching signal;

a display area setting section which sets the display area of the display panel while dividing the display area from one to a plurality of partial display areas in which an image is displayed and from one to a plurality of background display areas in which an image is not displayed;

an image displaying section which displays an image based on a display signal in the partial display area;

and an background color setting section which sets a display color of the background display area, the display color being set through a display area setting section, to any one color of eight colors provided by combining RGB display color of the background display area, the color being set in accordance with an input color specification signal.

To achieve the above described effect, a portable apparatus comprising the display device according to the invention, comprises a display panel including a plurality of display pixels arranged in a matrix, and a display area capable of displaying in color;

a display mode switching section which switches a display mode of the display panel to a full-screen display mode in which an image is displayed in the entire display area of the display panel during an operation of the portable apparatus, and for switching a display mode of the display panel to a partial display mode in which an image is only partially displayed in the display area of the display panel in the case where a non-operation state is continued for a predetermined period;

a display area setting section which sets the display area of the display panel while dividing the display area from one to a plurality of partial display areas in which an image is displayed and from one to a plurality of background display areas in which an image is not displayed;

an operation state determining section which determines an operation state of the portable apparatus;

and a background color setting section which sets a display color of the background display area, the display color being set through a display area setting section, to any one color of eight colors provided by combining RGB display color of the background display area, the color being set in accordance with an operation state to be determined through an operation state determining section.

The portable apparatus is, for example, a mobile telephone, in which the operation state to be determined through the operation state determining section includes at least any one of the states, such as whether or not the mobile telephone has received an incoming call, whether or not the mobile telephone is in a communication state, whether or not a communication partner is a predetermined one, whether or not the battery remaining amount is within a predetermined range, whether or not the number of communications is a predetermined number, whether or not an incoming call sound can be output, and whether or not a date and hour are predetermined ones.

Accordingly, the display device according to the invention and the portable apparatus comprising this device have the partial display mode, so that the electric power consumption can be reduced. And further, the background display area in the partial display mode is displayed in a predetermined color, not in simple white or black. As for the portable apparatus, the color of the background display area is turned into the color corresponding to an operation state of the apparatus, and thus the dullness at the time of the partial display can be dissolved, and further the user's convenience can be improved.

BRIEF DESCRIPTION OF DRAWINGS

FIG. 4 is a diagram showing an example of kind and constitution of registers that store set values pertaining to a partial display in the display device of the first embodiment;

FIG. 6 is a flow chart showing a control operation in the display device of the first embodiment;

FIG. 10 is a diagram showing an example of a corresponding table showing the corresponding relations between the remaining amount of the battery and color specification signals in the mobile telephone of the second embodiment;

FIGS. 11A and 11B are diagrams showing an example of the state of the mobile telephone before and after an operation mode is selected through a button operation in the mobile telephone of the second embodiment;

FIG. 12 is a diagram showing an example of a corresponding table 51 that stores the corresponding relations between external inputs and color specification signals in a mobile telephone of the second embodiment;

FIG. 13 is a diagram showing an example of a corresponding table that stores incoming call sounds and color specification signals while corresponding them to one another in the mobile telephone of the second embodiment;

FIG. 14 is a diagram showing an example of an incoming call history data table that stores incoming call histories in the mobile telephone of the second embodiment;

FIG. 15 is a diagram showing an example of a corresponding table to set the corresponding relations between the incoming call frequency and color specification signals in the mobile telephone of the second embodiment;

FIG. 16 is a diagram showing an example of a schedule management table in the mobile telephone of the second embodiment;

FIG. 17 is a diagram showing an example of a corresponding table that stores the corresponding relations between the ranges of the time difference in regard to a schedule and color specification signals in the mobile telephone of the second embodiment; and FIG. 18 is a diagram showing an example of kind and the constitution of the registers in the case where the color can be specified for each of two background display areas in the display device according to the invention.

BEST MODE FOR CARRYING OUT OF THE INVENTION

A display device in an embodiment according to the present invention and a portable apparatus comprising the display device, and the details of a control system thereof now will be described in detail based on the embodiment shown in the accompanying drawings.

Figure 1:
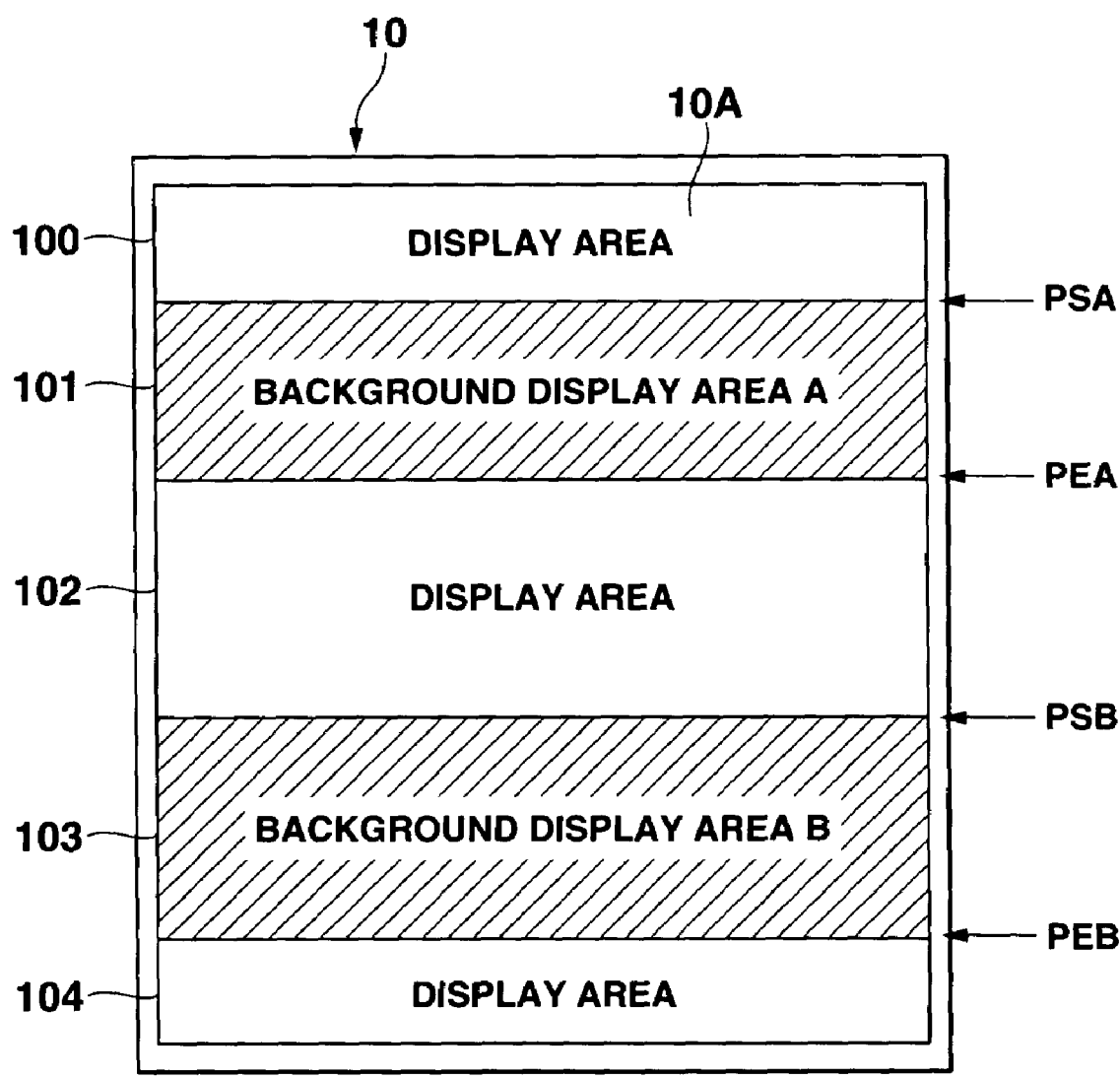
FIG. 1 is a diagram showing an example of a display state at the time of a partial display in a display device according to the present invention.

FIG. 1 is a diagram showing an example of a display state at the time of a partial display in the display device of the embodiment according to the invention.

In this embodiment, the display device comprises a liquid crystal display panel 10. As shown in FIG. 1, at the time of the partial display, a display screen 10A of the display panel 10 is set while being divided into three partial display areas 100, 102, 104 to display image data, a background display area A 101, and a background display area B 103.

In this case, the background display area is an area other than a partial display area at the time of the partial display, which corresponds to a conventional non-display area. However, the invention is characterized in that the background display area is not displayed simply in white or black, but is set to a predetermined display color.

In addition, symbols PSA, PEA, PSB, and PEB denote the names of registers to store addresses of the starting lines and the ending lines in the respective background display areas, which will be descried in detail later.

<First Embodiment>

Figure 2:
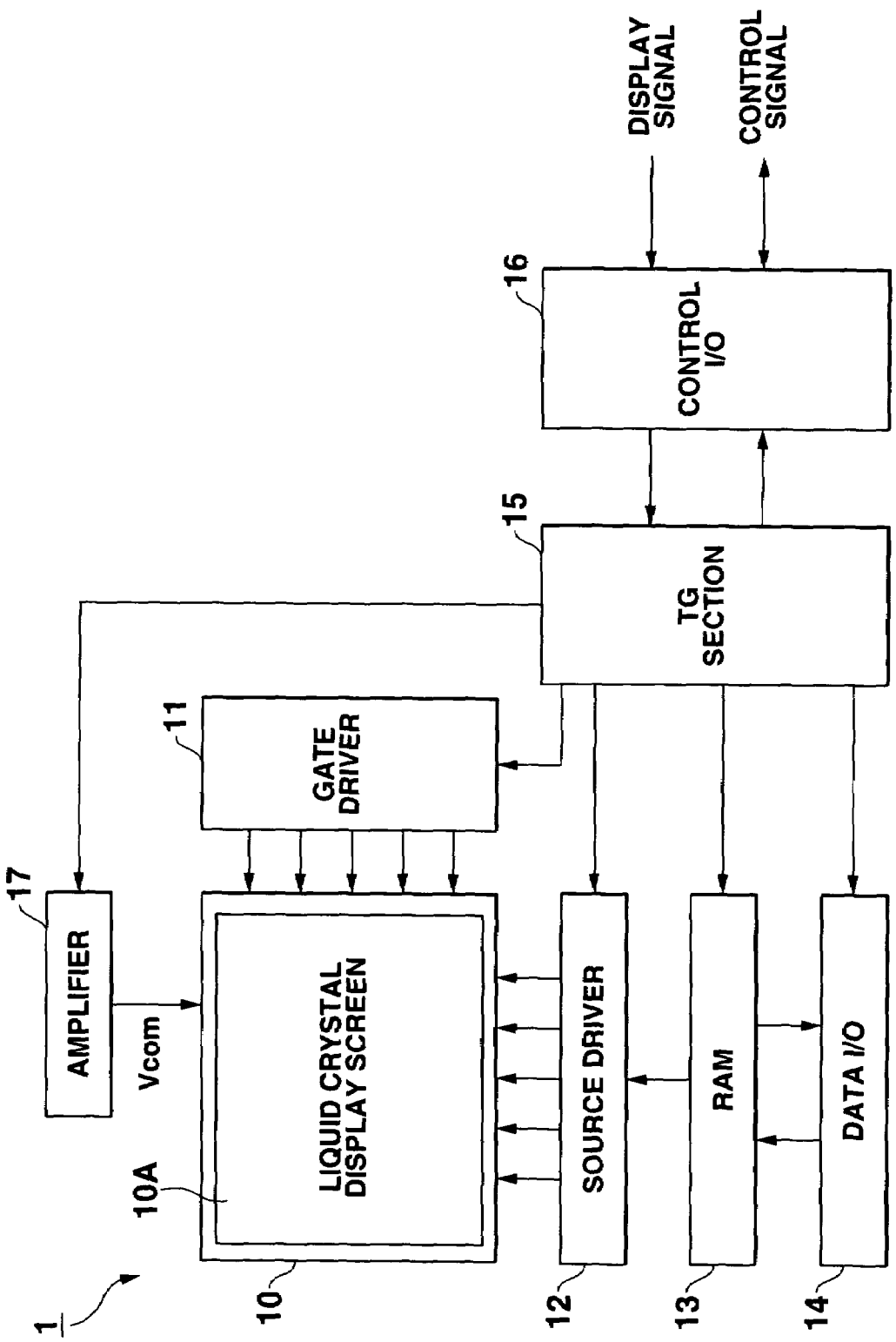
FIG. 2 is a block diagram showing an example of a circuit configuration of the display device in a first embodiment.

FIG. 2 is a block diagram showing an example of a circuit configuration of the display device in a first embodiment according to the invention. In this embodiment, the display device is assumed to be a liquid crystal display device 1 comprising the liquid crystal display panel 10.

As shown in FIG. 2, the liquid crystal display device 1 mainly comprises the liquid crystal display panel 10, a gate driver 11, a source driver 12, a RAM 13, a data I/O 14, a display timing generator (will be referred to as TG section 15, hereinafter), a control I/O 16, and an amplifier 17.

The data I/O 14 outputs a signal externally input, to the RAM 13. The control I/O 16 outputs a display signal and a control signal which are externally input, to the TG section 15, and externally outputs a control signal output from the TG section 15.

In addition, the amplifier 17 generates a common signal Vcom and supplies the signal to a common electrode of the liquid crystal display panel 10.

The liquid crystal display panel 10 displays an image in response to signals supplied from the gate driver 11 and the source driver 12. In this embodiment, an example will be described in the case where a liquid crystal display of an active matrix type comprising thin film transistors (TFT) (This liquid crystal display will be referred to as a TFT-LCD, hereinafter.).

The display device according to the invention is not limited to one using the TFT-LCD of this type, but may be the one using a liquid crystal display panel of a simple matrix type such as an STN etc. Further, the device is not limited to the liquid crystal display panel, but may be the one using a display panel of the other system such as an EL etc.

In this embodiment, the TFT-LCD is a display in which thin film transistors (TFT) and liquid crystal pixels are arranged in an array manner on a glass substrate. As is generally known, the liquid crystal display panel 10 mainly comprises a pair of glass substrates opposite to each other, color filters, and a back light. On one of the paired glass substrates, a plurality of scanning lines (gate lines) and a plurality of data lines are arranged and formed in a horizontal direction and a vertical direction, respectively. In the vicinity of each intersection of the plurality of gate lines and the data lines, a TFT and a pixel electrode are arranged. On the other glass substrate, the common electrode and color filters of red (R), green (G), and blue (B) are arranged. A liquid crystal is filled in between the glass substrates. In accordance with the signal voltage supplied from each gate line and each data line, the voltage of the pixel electrode is changed through the TFT and thus the array of the liquid crystal between the pixel electrode and the common electrode is changed. Thus, the light amount of the light that is incident from the back light and transmits through the color filters is controlled so as to indicate shading of each color. Through the combination of the shading of each color, various display colors are formed so as to display a desirable image.

Figures 3, 5:
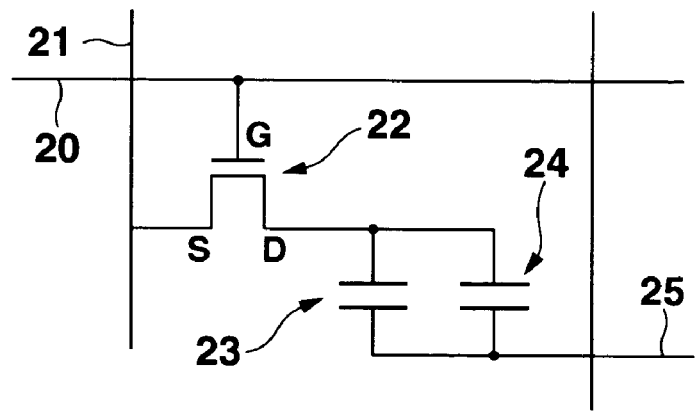
FIG. 3 is an equivalent circuit diagram showing a configuration of a display pixel section in a liquid crystal panel of a TFT-LCD.
FIG. 5 is a diagram showing the combinations of ON and OFF for three colors of RGB and correspondences of display colors to be set in a background display section.

FIG. 3 is an equivalent circuit diagram showing a configuration of a display pixel section in the liquid crystal panel of the TFT-LCD. At the position corresponding to the intersection of a gate line 20 and a data line 21, there are arranged a TFT 22, a pixel capacity 23 formed of a liquid crystal interposed between a pixel electrode connected to a drain electrode D of the TFT and a common electrode 25, and an auxiliary capacity 24 constituted by an auxiliary capacity electrode connected to the common electrode 25 through an insulating film. The gate line 20 is connected to a gate electrode G of the TFT 22, the data line 21 is connected to a source electrode S of the TFT 22. When sequential pulse voltage (scanning signal) is applied to the gate line 20, this voltage is applied on the gate electrode G of the TFT 22 connected to the gate line 20. Then, the TFT 22 is turned into an ON state, so that the drain electrode D is conducted to the source electrode S. Accordingly, a display signal voltage supplied from the data line 21 is applied on the pixel capacity 23 and the auxiliary capacity 24, and then electric charges are accumulated in the capacities, thereby ending a scan of one line. After the TFT 22 is turned into an OFF state, the electric charges are still stored, and the voltage is applied on the liquid crystal interposed between the pixel electrode and the common electrode.

The gate driver 11 scans sequentially on each gate line 20 of the liquid crystal display panel 10, and applies a scanning signal sequentially to each gate line 20. More specifically, this gate driver 11 has, for example, a shift register, and applies sequentially the scanning signal on each of the gate line at the timing specified by the TG section 15, thereby applying scanning signals sequentially on all of the gate lines 20.

The source driver 12 supplies a signal voltage in accordance with a display signal to each data line 21 of the liquid crystal display panel 10. More specifically, this source driver 12 has a shift register, and applies the signal voltage generated in accordance with the display signal transferred from the RAM 13 (will be described later), which stores the display signal, at the timing specified by the TG section 15.

The TG section 15 calculates an address of the display signal to be read from the RAM 13 in response to a scanning operation of each gate line 20 by the gate driver 11 and a shifting operation of the data line 21 by the source driver 12. Further, at the timing of reading data, the TG section 15 reads the display signal stored in the calculated address in the RAM 13 and transfers the signal to the source driver 12.

At the time of the partial display (will be described later), a set value of each color pixel is applied from the TG section 15 to the source driver 12 as the display signal of the background display area.

The RAM 13 has a storage area corresponding to each pixel of the liquid crystal display panel 10. At the time of writing, the display signal is input from the data I/O 14, and an address specification signal is input from the TG section 15, thereby writing the display signal data in the specified address. At the time of reading, the address specification signal is input from the TG section 15, and the RAM 13 reads the display signal information of the specified address, and outputs the information to the source driver 12. The RAM 13 has at least the storage capacity of the amount corresponding to one display screen of the liquid crystal display panel 10. For example, in the case where the liquid crystal display panel 10 has the number of dots, 132×176 (one dot=the amount corresponding to three pixels of red, green, and blue), the RAM 13 has the storage capacity of 132×176×16 (bits), for example. The breakdown of the 16 bits is constituted by 5 red bits, 5 blue bits, and 6 green bits. As a result, as for red and blue, it is possible to express up to the 5th power of 2 ($2^5$) gradations, and as for green, it is possible to express up to the 6th power of 2 ($2^6$) gradations.

The RAM 13 is provided so as to reduce the electric power consumption of the liquid crystal display device 1. That is, in the case where, for example, the same image is continuously displayed, firstly, the display signal data is stored in the RAM 13 by the amount corresponding to one display screen. Then, a display on the display screen after the storage is performed based on the display signal data stored in the RAM 13. Therefore, during this period, it is possible to stop supplying a new display signal to the liquid crystal display device 1, so that the electric power consumption can be reduced.

The TG section 15 comprises a timing pulse generating section that is input with a control signal externally through the control I/O 16 and set and controlled by the control signal to generate various timing pulses, and a plurality of registers in which various setting values (will be described later) pertaining to each operating state including a partial display according to the present embodiment. Therefore, the TG section 15 generates various timing pulses through the timing pulse generating section, thereby performing processes such as a switching from/to a general full-screen display mode to/from a partial display mode, a driving control of the gate driver 11 and the source driver 12, a timing of reading/writing operation of the RAM 13, a reading to the RAM 13, an address calculating process at the time of writing, a generating process of a generating reversal signal of the common voltage Vcom to be supplied to the amplifier 17, and a process of generating a serial communication command signal for a power supply voltage generation regulator IC control, which generates a driving voltage of each section of the display device (not shown), etc.

In the embodiment, the liquid crystal display device 1 displays the liquid crystal display panel 10 by dividing the panel into the display area and the background display area as shown in FIG. 1 in response to control signals supplied externally. That is, the liquid crystal display device 1 performs a partial display. The TG section 15 performs various setting and processes at the time of this partial display.

FIG. 4 is a diagram showing an example of kind and constitution of registers, which store set values pertaining to the partial display in the display device of the first embodiment according to the invention. Hereinafter, as a matter of convenience, the description will be made while assuming that each register has eight bits. However, the register is not limited to this eight bits register. It may be set appropriately depending on the necessity.

In FIG. 4, a register identification code is a code number to identify each register among a plurality of registers. The register identification code is input externally so as to specify each register for setting each register through the control I/O 16.

A register name indicates a name of each register. A bit indicates a bit in each register. A content indicates a content expressed by each bit in each register.

In FIG. 4, the PSA register of the identification code "11001" stores an address (8 bits) of the starting line (gate line) of a background display area A shown in FIG. 1. The PEA register of the identification code "11010" stores an address (8 bits) of the ending line of a background display area A.

Similarly, the PSB register of the identification code "11011" stores an address (8 bits) of the starting line of a background display area B, and the PEB register of the identification code "11100" stores an address (8 bits) of the ending line of a background display area B.

The identification code "11101" denotes a display color setting register that stores information on the display color to be displayed on the background display area. The first bit ($2^0$ place) of the display color setting register denotes the presence/absence (ON or OFF) of the red (R) display, the second bit ($2^1$ place) denotes the presence/absence (ON or OFF) of the green (G) display, and the third bit ($2^2$ place) denotes the presence/absence (ON or OFF) of the blue (B) display.

When the identification code "11101" of the display color setting register and the signal (1 or 0) to specify the display presence/absence of each RGB color are input as a color specification signal externally through the control I/O 16, the TG section 15 performs a process of storing the input color specification signal in each bit corresponding to the display color setting register. In the case where the display color setting register has eight bits, bit(s) other than the bits used for specifying the display presence/absence of each of the RGB colors ($4^{th}$ to $8^{th}$ bits) may be used for the other purpose, for example, for setting driving conditions of the background display area.

FIG. 5 is a diagram showing the combinations of the ON/OFF (1/0) of the RGB three colors and the correspondences of display colors set in the background display section. Here, as for the output of each color, for example, it is assumed that "1" corresponds to the output ON, and "0" corresponds to the output OFF. Then, colors of eight kinds can be specified by the combination of the output presence/absence of each RGB color. For example, in the case where all of the RGB are in the OFF (0) state, the background display section is displayed in black. On the contrary, when all of the RGB are in the ON (1) state, the background display section is displayed in white. When the R and G are in the ON (1) and the B is in the OFF (0), yellow color is displayed by the combination of red and green. When the R is in the ON (1), the G is in the OFF (0) and the B is in the ON (1), magenta color is displayed by the combination of red and blue. Also, when the R is in the OFF (0), the G and B are in the ON (1), cyan color is displayed by the combination of green and blue.

Next, a control operation at the time of partial displaying by the TG section 15 will be described.

FIG. 6 is a flow chart showing the control operation through the TG section 15 in the display device of the first embodiment according to the invention. In FIG. 6, it is assumed that the display signal data by the amount corresponding to one display screen of the liquid crystal display panel 10 is written in the RAM 13.

(Step S1)

Firstly, when the control signal to set the partial display mode is input externally through the control I/O 16, the TG section 15 stores information on the color specified by the display color setting register in response to the color specification signal input externally.

That is, the ON/OFF information of each RGB color is stored in the display color setting register (see FIG. 4) to store the color to be displayed in the background display area.

(Step S2)

Subsequently, the TG section 15 turns a variable "i" that stores a gate line address into "1", and outputs the control signal to apply a scanning signal on the first gate line to the gate driver 11.

(Step S3)

Then, the TG section 15 refers to the values of the registers PSA, PSB, PEA and PEB, in which the starting addresses and the ending addresses of the background display areas are stored, and determines whether or not the gate line address "i" is included in the range of the background display area A (PSA$\leq$"i"$\leq$PEA).

(Step S4)

Subsequently, when the gate line address "i" is determined not to exist in the range of the background display area A in the Step S3, the TG section 15 determines whether the gate line address "i" is within the range of the background display area B (PSB$\leq$"i"$\leq$PEB).

(Step S5, Step S6)

When the gate line address "i" is determined to be included neither in the background display area A nor the background display area B, it is determined to be the display area. Then, data are read from the RAM 13 and transferred to the source driver 12.

At this time, the TG section 15 turns a variable "k" that stores a data line address into "1", and reads the data of an address ("k", "i") from the RAM 13 and transfers the read data to the source driver 12. That is, the voltage based on the data stored in the address ("k", "i") in the RAM 13 is applied on the $K^{th}$ data line through the source driver 12.

(Step S7, Step S8)

Subsequently, the TG section 15 adds "1" to the data line address "k". Then, assuming the total number of the data lines to be "m", the TG section 15 determines whether or not the variable "k" is equivalent to "m+1", that is, the TG section 15 determines whether or not all of the data lines are applied with the voltage.

When it is determined that the variable "k" is equivalent to "m+1", and the process is ended on all of the data lines, the procedure goes to a Step S13.

On the other hand, when it is determined that the value of the variable "k" is smaller than "m+1", and the process has not been ended on all of the data lines, the procedure returns to the Step S6 and the process is repeated.

(Step S9)

In the Step S3 or Step S4, when it is determined that the gate line address "i" is included in either the background display area A or the background display area B, it is determined to be the background display area. Then, a display color based on the display color information stored in the display color setting register is displayed in each background display area.

That is, the voltage to be applied on each data line is set in accordance with the display color information stored in the display color setting register. More specifically, firstly, the value of the data line address "k" is set to "1".

(Step S10)

Subsequently, the voltage to be applied on the $k^{th}$ data line is set in accordance with the information stored in the display color setting register.

More specifically, for example, in the case where pixels are arranged in the order of RGB along the gate line, the remainder, which is obtained when the variable "k" is divided by "3", is examined. When the remainder is zero (that is, the variable corresponds to R pixel with "k"=0, 3, . . . ), the red setting value (the value of the first bit: "1" or "0") stored in the display color setting register is read, and output the read value to the source driver 12. When the remainder is "1" (that is, the variable corresponds to G pixel with "K"=1, 4, . . . ), the green setting value (the value of the second bit: "1" or "0") is read from the display color setting register, and output the read value to the source driver 12. When the remainder is "2" (that is, the variable corresponds to B pixel with "K"=2, 5, . . . ), the blue setting value (the value of the third bit: "1" or "0") is read from the display color setting register, and output the read value to the source driver 12.

In this step, employed is a system in that color of corresponding pixel is determined by judging the remainder that is obtained when the variable "k" is divided by "3". However, it is needless to mention that a system is not limited to this system.

(Step S11, Step S12)

Subsequently, the TG section 15 adds "1" to the data line address "k". As for the total number of data lines "m", the TG section 15 determines whether or not the variable "k" is equivalent to "m+1", that is, whether or not the voltage is set to all of the data lines.

When it is determined that the value of the variable "k" is equal to "m+1" and the process is ended to all of the data lines, the procedure goes to the next Step S13.

On the other hand, if it is determined that the value of variable "k" is smaller than "m+1" and the process has not been ended to all of the data lines, the procedure returns to the Step S10 and the process is repeated.

(Step S13)

Subsequently, the TG section 15 adds "1" to the value "i" of the gate line register that stores the gate line address.

(Step S14)

Then, assuming the total number of the gate lines to be "n", it is determined whether or not the variable "i" is equivalent to "n+1".

When it is determined that the variable "i" is equal to "n+1" and the process has been ended to all of the gate liens, the procedure goes to the next Step S15.

On the other hand, if it is determined that the variable "i" is smaller than "n+1" and the process has not been ended to all of the gate lines, the procedure returns to the Step S3 and the process is performed to the next gate line.

(Step S15)

Subsequently, after the completion of the process to all of the gate lines, it is determined whether or not the partial display mode is to be end.

When a control signal to release the partial display mode is input externally, this process is ended.

On the other hand, when the control signal to release the partial display mode is not input, the partial display mode is continued. Then, the procedure returns to the Step S2. And then, the TG section 15 returns the variable "i", which stores the gate line address, to "1" again so as to display an image of the next frame, and repeats the process from the first gate line.

As described above, for displaying the background display area in the partial display mode, the TG section 15 displays color that is specified by the display color information set by the display color setting register without using the data stored in the RAM 13.

That is, in the partial display mode, the TG section 15 switches the reading of the RAM 13 and the display color setting register. When the gate line which is being scanned, is in the display area, the TG section 15 controls to read the data from the RAM 13, and when the gate line is in the background display area, the TG section 15 controls to read the data from the register.

As described above, the liquid crystal display device 1 according to the embodiment divides the liquid crystal display panel 10 into the display area and the background display area in the partial display mode, and sets the background display area to the color that is set beforehand. In this manner, the background display area can be displayed with a predetermined color without being set to simply in white or black, so that the dullness at the time of the conventional partial display can be solved, thereby improving commercial value.

Further, in regard to the display control in the background display area, there is no display signal stored in the RAM 13. Therefore, in the partial display mode, the RAM 13 may only use the area corresponding to the display area, so that a driving area of the RAM 13 can be limited. As a result, comparing with the case of the normal full-screen display mode in which entire area of the RAM 13 is used so as to display the image data stored in the RAM 13 on the full-screen of the liquid crystal display panel 10, the electric power consumption required to drive the RAM 13 can be reduced.

<Second Embodiment>

Next, the case will be described in that the display device according to the invention is applied to a portable apparatus such as a mobile telephone, and portable information terminal, etc.

Figure 7:
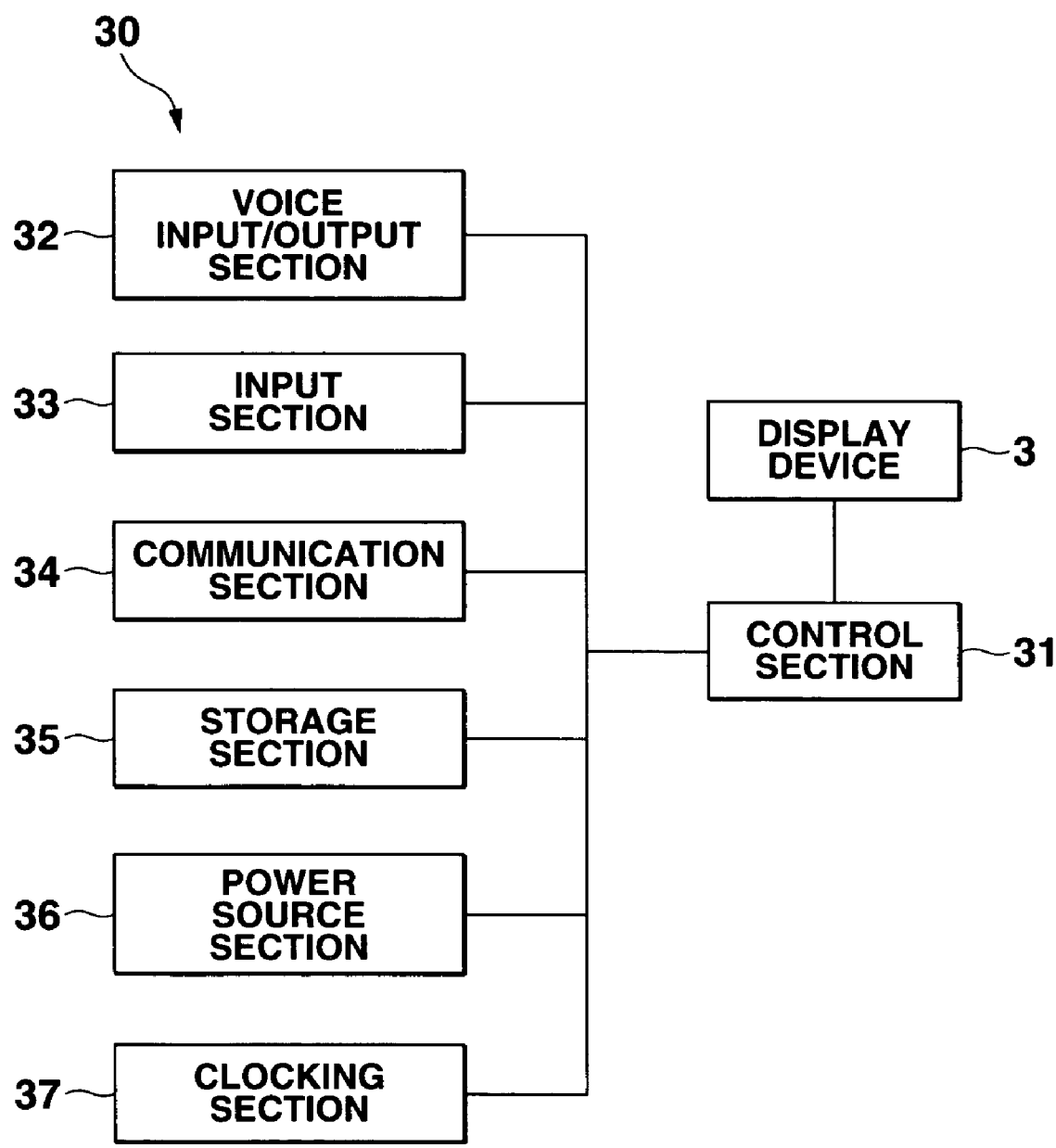
FIG. 7 is a block diagram showing an example for a configuration of a portable apparatus in a second embodiment according to the invention.

FIG. 7 is a block diagram showing an example of configuration of a portable apparatus in the second embodiment according to the invention. Incidentally, in the embodiment, the case will be described in that the display device is applied to a mobile telephone as an example of the portable apparatus.

In FIG. 7, a mobile telephone 30 comprises a display device 3, a control section 31, a voice input/output section 32, an input section 33, a communication section 34, a storage section 35, a power source section 36, and a clocking section 37.

The display device 3 has, for example, the same structure as one of the liquid crystal display device 1 shown in FIG. 2 in the first embodiment. Although it is not shown, the display device 3 mainly comprises a liquid crystal display panel, a gate driver, a source driver, a RAM, a data I/O, and a TG section, etc., and also has a full-screen display mode and a partial display mode. In the partial display mode, as it will be described later, the display device 3 has a function of displaying a color corresponding to an operational state of the apparatus in a background display area.

The control section 31 executes various processes such as a process of controlling each section in accordance with a program or data stored in the storage section 35, and a process of variously calculating in accordance with signals input from the input section 33, etc. Depending on the necessity, the control section 31 stores the results of the processes in the storage section 35 and transfers image data to the liquid crystal display device 1 so as to display it.

The voice input/output section 32 includes a loudspeaker and a microphone, and outputs a voice externally in accordance with a sound signal input from the control section 31 and the communication section 34. The voice input/output section 32 also detects an external voice and generates a voice signal, and outputs the generated signal to the control section 31 and the communication section 34.

The input section 33 has a numeric pad and function keys. The input section 33 generates a signal in accordance with a key pressed down by a user and outputs the signal to the control section 31 and the communication section 34.

The communication section 34 executes communication in accordance with the instruction input from the control section 31. That is, the communication section 34 performs processes such as a calling out to the instructed telephone number, establishing a radio circuit, receiving/transmitting data or a voice, and cutting a communication circuit, etc. More specifically, on receiving an electric wave from a base station, the section 34 selects a necessary channel and reads a signal, and also demodulates the read signal and outputs it to the voice input/output section 32, and further displays the signal on the liquid crystal display panel 10. Alternatively, the communication section 34 modulates the data input from the control section 31 and the voice input from the voice input/output section 32, selects a channel to be transmitted, and transmits the input data and the voice to the base station.

The storage section 35 is realized by a storage medium such as a RAM, ROM (EEPROM, flash memory, IC card), etc. The RAM has a work area that is used for function sections of the mobile telephone 30 such as the control section 31 and the communication section 34 to execute various processes. The storage section 35 develops the information specified by each function section in the work area, and allows rewriting or reading in accordance with an instruction from each function section. In the ROM, a program or data necessary for the respective function sections, which constituting the mobile telephone 30, to execute various processes are stored beforehand. The storage section 35 performs a process of storing the necessary information in a specified area in the storage medium such as the RAM, EEPROM, flash memory, etc. in accordance with the instruction input from the control section 31 or the communication section 34.

The power source section 36 supplies a power source to each circuit in the mobile telephone 30. The clocking section 37 is a function section to clock the lapse of real time.

Figure 8:
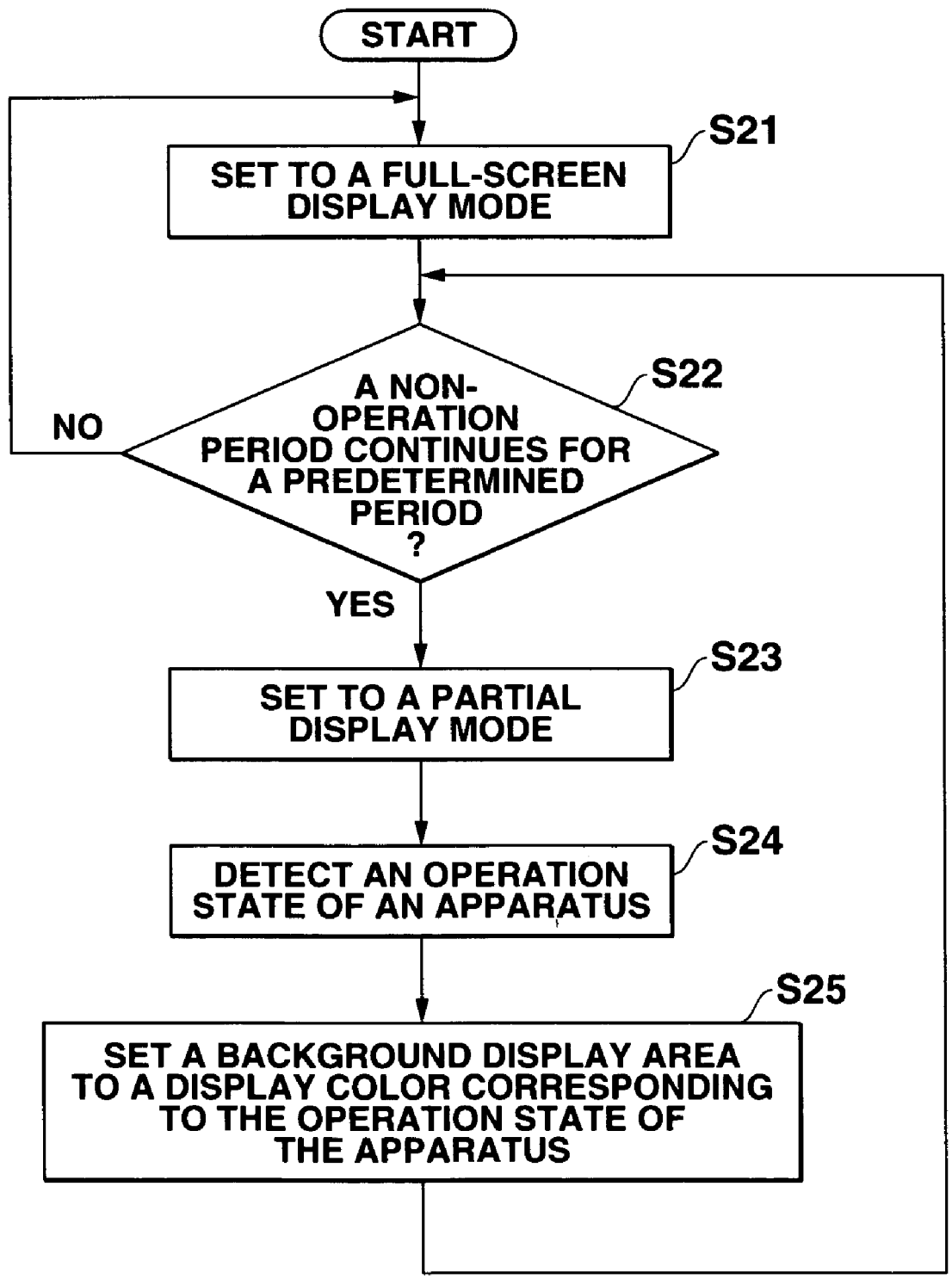
FIG. 8 is a flow chart showing an outline of a control operation in a mobile telephone of the second embodiment.

Next, a control operation in the mobile telephone 30 in the embodiment will be described. FIG. 8 is a flow chart showing an outline of the control operation in the mobile telephone 30 according to the second embodiment.

(Step S21)

Firstly, during an operation and use such as an input of the telephone number performed by a key operation, various setting operations, etc., the display device 3 is set to the full-screen display mode, which displays information on the full screen of a display panel.

(Step S22)

Subsequently, the operation state of the mobile telephone 30 is monitored, and it is determined whether or not a non-operation period, during which no operation is performed, is continued for a predetermined period.

In an operation period such that the non-operation period is not continued for the predetermined period, the procedure returns to the Step S21, and the full-screen display mode is continued.

On the other hand, it is determined the non-operation period is continued for the predetermined period in a stand-by state such as a receiving stand-by state, the procedure moves to the next Step S23.

(Step S23)

Then, when it is determined that the non-operation period is continued for the predetermined period in the Step 22, a control signal to set the partial display mode is applied to the display device 3 so as to set the display device 3 to the partial display mode.

(Step S24)

Subsequently, the operation state of the mobile telephone 30 is detected. In this case, although the specific example of the operation state is omitted, detected are states such as the status of the battery remaining amount, information on an incoming call partner, an incoming call history, and a set incoming call sound, etc.

(Step S25)

Then, the control section 31 determines the color to be displayed in the background display area in accordance with the operation state detected in the Step S24, and outputs a color specification signal to the liquid crystal display device 1, so that the background display area is set to the display color corresponding to the operation state.

After that, the procedure returns to the Step S22. Then, the control section 31 monitors the operation state of the mobile telephone 30, and determines whether or not the non-operation period, during which no operation is performed, is continued for the predetermined period.

When the non-operation period is not continued for the predetermined period, a control signal to release the partial display mode is applied to the display device 3, and the partial display mode is released so as to set to the full-screen display mode.

On the other hand, the non-operation period is continued, the partial display mode is continued.

Next, an operation state of the mobile telephone 30, which is detected in the Step S24 and a specific example of color specification system in the background display area corresponding to the operation state will be described.

Incidentally, a corresponding table (shown below) that stores the corresponding relation between the operation state of the mobile telephone 30 and color specification signals is assumed to be stored in the storage section 35.

(1) Battery Remaining Amount

The color of the background display area may be changed in accordance with the change in the battery remaining amount.

FIGS. 9A, 9B, and 9C are diagrams showing an example of the case where the color of the background display area is changed in accordance with the battery remaining amount, which shows the case where the battery remaining amount decreases in the order from FIG. 9A to FIG. 9C, and the color of the background display area is to be changed in accordance with the change of the battery remaining amount. In this example, in the state where the electric power is sufficiently stored in the battery (power source section 36), the color of the background display area is set in blue (FIG. 9A). It is also set such that, when the battery remaining amount is down by half, the color becomes yellow (FIG. 9B), and when the battery remaining amount decreases, the color becomes red (FIG. 9C). In this manner, the user can determine immediately the battery remaining amount by the change in color.

That is, the control section 31 determines the remaining amount of the electric power stored in the power source 36, and specifies the color to be displayed in the background display area in accordance with the remaining amount.

FIG. 10 is a diagram showing an example of a corresponding table 50 showing the corresponding relation between the battery remaining amount and color specification signals. In FIG. 10, there is shown the case where the level of the battery remaining amount is classified into three levels, for example, 0 to 30%, 30 to 60%, and 60 to 100%.

According to FIG. 10, in the case where the level of the battery remaining amount is small, i.e., in 0 to 30%, the color specification signal "11101100" is output to the liquid crystal display device 1. In this case, the first five figures "11101" correspond to an identification code of the display color setting register in the liquid crystal display device 1. That is, those five figures specify a register to store a color to be displayed in the background display area. The rest three figures "100" are a signal to specify the presence/absence of the outputs of red, green, and blue. That is, the rest three figures "100" express that only red is output and blue and green are turned into OFF. Therefore, in this case, the color of the background display area is specified in red.

Similarly, in the case where the battery remaining amount is at the medium level, i.e., in 30 to 60%, the color of the background display area is specified in yellow. In the case where the battery remaining is a large amount, i.e., in 60 to 100%, the color of the background display area is specified in blue.

Figure 9:
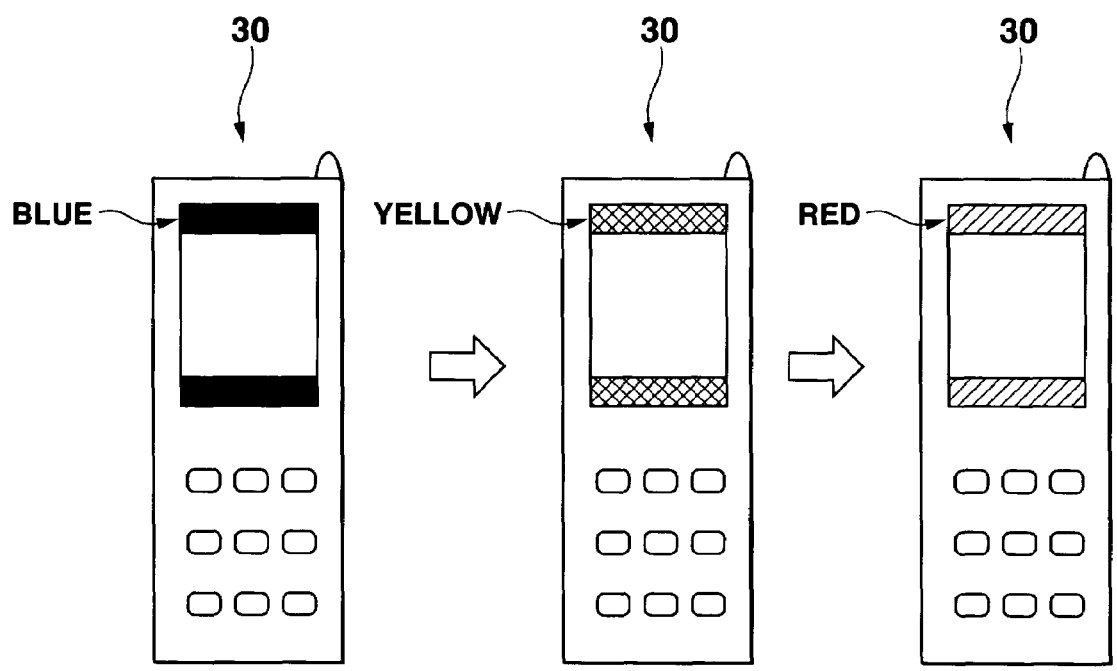
FIGS. 9A, 9B and 9C are diagrams showing an example in the case where the color of a background display area is changed in accordance with a battery remaining amount in the mobile telephone of the second embodiment.

In this manner, since each range of the battery remaining amount and the color specification signal are set to correspond to each other, the color of the background display area can be specified in accordance with the battery remaining amount, as shown in FIG. 9.

Incidentally, various systems can be employed as a system to determine the electric power remaining amount stored in the power source section 36. For example, there can be a current integration system through which a charge and discharge current in the power source section is determined so as to detect the remaining amount, a voltage system through which the remaining amount is detected based on a terminal voltage of the power source section and the remaining amount characteristic, and the like. However, in this embodiment, a system is not particularly limited. Needless to say that any system may be employed.

(2) External Input

The system may be constructed such that the display color of the background display area is changed in accordance with an incoming call from the outside or an input signal input from the input section 33 through a key operation.

For example, when a notification signal that has received information from the communication section 34 is input, the control section 31 is configured to output a color specification signal to the liquid crystal display device 1 so as to display a particular color (for example, green) for an incoming call in accordance with the incoming call notification signal.

Alternatively, when the user selects a manner mode (that is, a mode of outputting no incoming call sound, or no input sound, etc.), the control section 31 may be configured to output the color specification signal to the liquid crystal display device 1 so as to display a particular color (for example, blue) for the manner mode in accordance with a button operation for the selection.

FIG. 11A is a diagram showing an example of the state before an operation mode is selected by a button operation, and FIG. 11B is a diagram showing an example for the state of the mobile telephone 30 after the operation mode is selected by the button operation.

In this manner, since the corresponding color of the background display area is specified in accordance with an incoming call operation or the setting of the apparatus by the button operation, the user can immediately determine the presence/absence of an incoming call and a set status of the mobile telephone 30 through the color displayed in the background display area.

FIG. 12 is a diagram showing an example of a corresponding table 51 that stores the corresponding relation between external inputs and color specification signals.

In FIG. 12, an incoming call notification signal input from the communication section 34, and operation signals A and B, etc. input from the input section 33 are set while being linked with the color specification signals, respectively.

The control section 31 has a capability of determining the signal input from each function section, and specifying the color specification signal to be output to the liquid crystal display device 1 while referring to the corresponding table 51.

Alternatively, the control section 31 may be configured such that the color specification signals are set to correspond to the notification signals from the communication section 34, the signal expressing that a transmission process such as a mail transmission etc. is completed, or to the notification signal expressing that an access to a WEB site is completed, and the color specification signal is output to the liquid crystal display device 1 in response to these notification signals.

(3) Incoming Call Sound

As for the mobile telephone 30 in recent years, the user selects an incoming call sound freely, or inputs it. Therefore, each set incoming call sound may be corresponded to the color to be set to the background display area, and when the mobile telephone 30 receives an incoming call, the color to be displayed in the background display area may be changed in accordance with an incoming call sound to be output.

That is, when the incoming call notification signal is input from the communication section 34, the control section 31 specifies the incoming call sound to be output and outputs it to the voice input/output section 32. At this time, the control section 31 selects the color to be set to the background display area corresponding to the specified incoming call sound, and outputs the color specification signal to the liquid crystal display device 1.

FIG. 13 is a diagram showing an example of a corresponding table 52 that stores incoming call sounds and color specification signals while the sound and signal are corresponded to each other.

In FIG. 13, each of the incoming call sounds and each of the color specification signals are set while being corresponded to each other. When the incoming call sound to be output is specified, the control section 31 reads the color specification signal corresponding to the incoming call sound while referring to the corresponding table 52, and outputs it to the liquid crystal display device 1.

Alternatively, the color to be displayed in the background display area may be changed in accordance with a melody of the incoming call sound.

More specifically, for example, the time from the generation of the sound and the color specification signal are set to correspond to each other for each incoming call sound. At the time of outputting the incoming call sound, the time is clocked through the clocking section 37. At the same time, the output timing of the color specification signal is taken and output to the liquid crystal display device 1.

Further, for example, in the case where the incoming call sound is set not to be output, the color corresponding to the incoming call sound may be displayed in the background display area instead of the incoming call sound.

(4) Incoming Call Frequency

The color of the background display area may be changed in accordance with the incoming call frequency for each communication party.

That is, the control section 31 stores an incoming call history one after another in the storage section 35, based on the incoming call notification signal input from the communication section 34, and further specifies the color to be displayed in the background display area in accordance with the number of incoming calls stored in the incoming call history.

FIG. 14 is a diagram showing an example of an incoming call history data table 53 storing an incoming call history.

In FIG. 14, for example, the telephone number of a caller, and the date and hour of receiving an incoming call are corresponded to each other. They are stored each time of receiving an incoming call in the incoming call history data table 53. On receiving the incoming call notification signal from the communication section 34, the control section 31 retrieves a telephone number that corresponds to the telephone number of the caller from the incoming call history data table 53, and obtains the number of incoming calls from the caller. Incidentally, when the time has passed more than a predetermined period from the incoming call date and hour stored in the incoming call history data table, the control section 31 eliminates information (i.e., the telephone number, and the date and hour of receiving an incoming call) corresponding to the incoming call date and hour. In this manner, the number of incoming calls for a certain period, namely, the incoming call frequency can be obtained by eliminating a past history with the lapse of time.

FIG. 15 is a diagram showing an example of a corresponding table 54 to set the corresponding relation between the incoming call frequency and the color specification signal.

In FIG. 15, the number of the incoming calls and the color specification signals are set while the number and signal are corresponded to each other in a corresponding table 54. On obtaining the incoming call frequency from the caller by the incoming call history data table 53, the control section 31 reads the color specification signal corresponding to the obtained incoming call frequency while referring to the corresponding table 54, and outputs the signal to the liquid crystal display device 1. In this manner, the color to be displayed in the background display area is changed in accordance with the incoming call frequency, so that the user can immediately determine, for example, the emergency degree of information through the color displayed in the background display area.

(5) Schedule

For example, in the case where the user's schedule has been input in a portable apparatus such as a mobile telephone etc., the color to be displayed in the background display area may be set in accordance with the user's schedule that has already been input.

FIG. 16 is a diagram showing an example of a schedule management table 55. In FIG. 16, the schedule management table 55 stores, for example, schedules (events), the detailed information, and the date and hour of the events, while corresponding each of them to one another. That is, when the event, the detailed information, and the date and hour of the event are input from the input section 33, the control section 31 stores them in the schedule management table 55 while corresponding them to one another.

FIG. 17 is a diagram showing an example of a corresponding table 56 that stores the corresponding relation between the range of the time differences and the color specification signals. In FIG. 17, the time difference denotes the difference between the real time clocked by the clocking section 37 and the date and hour stored in the schedule management table 55. For example, when the instruction to display the details of the event stored in the schedule management table 55 is input from the input section 33, the control section 31 reads the detailed information from the schedule management table 55 and outputs it to the liquid crystal display device 1. Further, the control section 31 calculates the difference between the date and hour of the event and the real time, and reads the corresponding color specification signal from the corresponding table 56 and outputs the signal to the liquid crystal display device 1.

In this manner, a clocking process through the clocking section 37 is linked to the schedule management, so that an advance notification or the like can be displayed the color, which draws user's attention.

As described above, in a portable apparatus such as a mobile telephone, portable information terminal and the like, a background display area is displayed colorfully while linking operation states of the apparatus to its various functions, so that the dullness of the conventional partial display can be solved and the commercial value can be increased. Furthermore, the user's convenience can be improved dramatically.

The detailed parts described above in the embodiment are not limited to the aforementioned contents, but can be modified appropriately.

For example, in the above embodiment, there has been described the case where the background display area is set to two areas A and B in the partial display mode. However, the number of the background display areas is not limited to two. It is obvious that the number may be set to a modifiable number appropriately in accordance with usage and status.

For example, it can be realized by a setting, such that a signal to specify propriety to read a register, which stores the starting position and the ending position of the background display area, is output to the liquid crystal display device 1 with the color specification signal, and then, the liquid crystal display device 1 sets a background display area in response to the signal to specify the propriety to read the register, the signal being input with the color specification signal.

In addition, in the embodiment, there has been described the case where the single color is displayed in the two background display areas A and B. However, a system is not limited to the case. It is obvious that the system may be constructed such that the different color can be specified for each background display area. This system can be realized, for example, by comprising registers that store colors to be displayed for the respective background display areas.

FIG. 18 is a diagram showing an example of registers of the liquid crystal display device 1 in the case where the color can be specified individually to the two background display areas A and B. In FIG. 18, the color of the background display area A is stored with a color setting A-register "11011", and the color of the background display area B is stored with the color setting B-register "11110". The system is set such that, during applying a voltage on the gate lines included in the background display area A, the display color information is read from the color setting A-register, and during applying a voltage on the gate lines included in the background display area B, the display color information is read from a color setting B-register.

Further, at least one background display area is to be displayed in a single color. Therefore, even though a thinned-out display is carried out for each predetermined time, the display state does not deteriorate much. Thus, for driving the background display area, the thinned-out display may be performed so as to further reduce the electric power consumption.

That is, the frequency of applying a voltage on the data lines in the background display area is reduced less than the frequency for each regular field. More specifically, the frequency is specified at the interval of the odd number field. That is, in general, the reversal voltage is applied on each one field. However, the output frequency in the background display area is changed so as to widen the interval of voltage application. For example, it is set such that the voltage is output with respect to every odd number fields, such as every third fields, every fifth fields, every seventh fields, . . . . In this manner, when the thinned-out drive is performed, some flickers occur. However, since the background display area is displayed in a single color, so that the flickers do not stand out. By doing this, the electric power consumption can be further reduced.

The invention claimed is:

1. A display device comprising:
   a display panel including a plurality of display pixels arranged in a matrix, and a display area capable of displaying in color;
   a display mode switching means for switching a display mode of the display panel to one of a full-screen display mode in which an image is displayed in an entirety of the display area of the display panel and a partial display mode in which an image is only partially displayed in the display area of the display panel;
   a display area setting means for setting the display area of the display panel while dividing the display area into at least one partial display area in which an image is displayed and at least one background display area in which an image is not displayed in the partial display mode;
   an image display means for displaying an image in the partial display area; and
   a background color setting means for setting a display color of the background display area to one of a plurality of colors including black and white.

2. The display device according to claim 1, wherein the background color setting means sets the display color of the background display area, to any one of eight colors provided by combining RGB.

3. The display device according to claim 1, further comprising a color specification signal input means for inputting a color specification signal externally, and
   wherein the background color setting means sets the display color of the background display area in accordance with the color specification signal input through the color specification signal input means.

4. A display device comprising:
   a display panel including a plurality of display pixels arranged in a matrix, and a display area capable of displaying in color;
   a display mode switching means for switching a display mode of the display panel to one of a full-screen display mode in which an image is displayed in an entirety of the display area of the display panel and a partial display mode in which an image is only partially displayed in the display area of the display panel;
   a display area setting means for setting the display area of the display panel while dividing the display area into at least one partial display area in which an image is displayed and at least one background display area in which an image is not displayed in the partial display mode;
   an image display means for displaying an image in the partial display area; and
   a background color setting means for setting a display color of the background display area;
   wherein the display area setting means sets at least two background display areas, and the background color setting means sets the display color for each of the set background display areas.

5. A display device comprising:
   a display panel including a plurality of display pixels arranged in a matrix, and a display area capable of displaying in color;
   a display mode switching means for switching a display mode of the display panel to one of a full-screen display mode in which an image is displayed in an entirety of the display area of the display panel and a partial display mode in which an image is only partially displayed in the display area of the display panel;
   a display area setting means for setting the display area of the display panel while dividing the display area into at least one partial display area in which an image is displayed and at least one background display area in which an image is not displayed in the partial display mode;
   an image display means for displaying an image in the partial display area; and
   a background color setting means for setting a display color of the background display area;
   wherein the display area setting means sets at least two partial display areas.

6. The display device according to claim 1, wherein the display mode switching means performs a switching operation between the full-screen display mode and the partial display mode in accordance with a mode switching signal input externally.

7. The display device according to claim 1, further comprising a display signal storage means for storing display signals by an amount corresponding to at least one display screen of the display section.

8. The display device according to claim 7, wherein the image display means displays the image in the partial display area in accordance with one of the display signals stored in the display signal storage means.

9. A portable apparatus comprising a display device, the display device including;
   a display panel comprising a plurality of display pixels arranged in a matrix, and a display area capable of displaying in color;
   a display mode switching means for switching a display mode of the display panel to one of a full screen display mode in which an image is displayed in an entirety of the display area of the display panel and a partial display mode in which an image is only partially displayed in the display area of the display panel;
   a display area setting means for setting the display area of the display panel while dividing the display area into at least one partial display area in which an image is displayed and at least one background display area in which an image is not displayed in the partial display mode;
   an image display means for displaying an image in the partial display area,
   an operation state determining means for determining an operation state of the portable apparatus; and
   a background color setting means for setting a display color of the background display area to one of a plurality of colors including black and white, corresponding to the operation state determined by the operation state determining means.

10. The portable apparatus according to claim 9, wherein the display mode switching means performs a switching operation between the full-screen display mode and the partial display mode such that, when the portable apparatus is being operated the display panel is switched to the full-screen display mode, and when the portable apparatus is in a non-operation state for a predetermined period the display panel is switched to the partial display mode.

11. The portable apparatus according to claim 9, wherein the display device further comprises a background color setting storage means for storing a set value of the display color of the background display area corresponding to the operation state determined by the operation state determining means.

12. The portable apparatus according to claim 9, wherein the background color setting means sets the display color of the background display area to any one of eight colors provided by combining RGB in the display device.

13. The portable apparatus according to claim 9, wherein the portable apparatus is a mobile telephone, and
   wherein the operation state determined by the operation state determining means includes at least one of a state indicating that the mobile telephone has received an incoming call, not a state indicating that the mobile telephone is in a communication state, a state indicating a predetermined communication partner, a state indicating that a battery remaining amount is within a predetermined range, a state indicating a predetermined number of communications, a state indicating that an incoming call sound can be output, and a state indicating a predetermined date and hour.

14. The portable apparatus according to claim 9, wherein the display area setting means in the display device sets a plurality of background display areas, and
   the background color setting means sets the display color for each of the set background display areas.

15. The portable apparatus according to claim 9, wherein the display area setting means in the display device sets a plurality of partial display areas.

16. The portable apparatus according to claim 9, wherein the display device comprises a display signal storage means for storing display signals by an amount corresponding to at least one display screen of the display section.

17. The portable apparatus according to claim 14, wherein the image display means displays the image in the partial display area in accordance with one of the display signals stored in the display signal storage means.

18. A method for controlling a portable apparatus having a display section which includes a display panel having a plurality of display pixels arranged in a matrix and a display area capable of displaying in color, said method comprising:
   switching to a partial display mode in which an image is only partially displayed in the display area of the display panel in accordance with an operation state of the portable apparatus;
   setting the display area of the display panel while dividing the display area into at least one partial display area in which an image is displayed and at least one background display area in which an image is not displayed in the partial display mode; and
   setting a display color of the background display area to one of a a plurality of colors including black and white, corresponding to the operation state of the portable apparatus.

19. The method according to claim 18, wherein a switching operation between the full-screen display mode and the partial display mode is performed at least such that, when the portable apparatus is being operated the display panel is switched to the full-screen display mode, and when the portable apparatus is in a non-operation state for a predetermined period the display panel is switched to the partial display mode.

20. The method according to claim 18, wherein the display color of the background display area is set to be any one of eight colors provided by combining RGB.

21. The method according to claim 18, wherein the portable apparatus is a mobile telephone, and
   wherein the operation state of the portable apparatus includes at least one of a state indicating that the mobile telephone has received an incoming call, not a state indicating that the mobile telephone is in a communication state, a state indicating a predetermined communication partner, a state indicating that a battery remaining amount is within a predetermined range, a state indicating a predetermined number of communications, a state indicating that an incoming call sound can be output, and a state indicating a predetermined date and hour.

22. The method according to claim 18, wherein the display color in the background display area is is set by performing a thinned-out driving operation in which a predetermined voltage is applied on the display pixels for at least every three fields, or more than three odd number of fields.

* * * * *